(12) United States Patent
Li et al.

(10) Patent No.: US 12,215,431 B2
(45) Date of Patent: Feb. 4, 2025

(54) PROCESSING AND RECYCLING METHOD AND PRODUCT OF ULTRATHIN LITHIUM FOIL

(71) Applicant: HUAZHONG UNIVERSITY OF SCIENCE AND TECHNOLOGY, Hubei (CN)

(72) Inventors: Huiqiao Li, Hubei (CN); Mingtao Hu, Hubei (CN); Tianyou Zhai, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 18/826,224

(22) Filed: Sep. 6, 2024

(65) Prior Publication Data

US 2024/0425989 A1   Dec. 26, 2024

Related U.S. Application Data

(63) Continuation of application No. PCT/CN2022/137856, filed on Dec. 9, 2022.

(30) Foreign Application Priority Data

Mar. 7, 2022   (CN) .......................... 202210224380.1

(51) Int. Cl.
   *C23F 1/14*   (2006.01)
   *C01D 7/06*   (2006.01)
   (Continued)

(52) U.S. Cl.
   CPC .................. *C23F 1/14* (2013.01); *C01D 7/06* (2013.01); *C01D 15/08* (2013.01); *C22B 3/205* (2013.01);
   (Continued)

(58) Field of Classification Search
   None
   See application file for complete search history.

(56) References Cited

U.S. PATENT DOCUMENTS

| 2021/0167359 A1 | 6/2021 | Guo et al. |
| 2022/0109146 A1* | 4/2022 | Nie ..................... H01M 4/1395 |

FOREIGN PATENT DOCUMENTS

| CN | 1612377 | 5/2005 |
| CN | 109873122 | 6/2019 |

(Continued)

OTHER PUBLICATIONS

Tang, Wei et al. "Chemically Polished Lithium Metal Anode for High Energy Lithium Metal Batteries" Energy Storage Materials, May 16, 2018 (May 16, 2018), pp. 290-293 (Year: 2018).*

(Continued)

*Primary Examiner* — Roberts P Culbert
(74) *Attorney, Agent, or Firm* — JCIPRNET

(57) ABSTRACT

Disclosed are a method for processing and recycling an ultrathin lithium foil and a product, which belongs to the field of lithium-ion batteries. According to the disclosure, a liquid-phase thinning agent is adopted to perform a contact reaction with a lithium metal, the fabricated ultrathin lithium foil has a thickness of 20 μm or less, the surface is flat, the thickness can be randomly regulated, and the uniformity is good. The method of the disclosure can also recycle a lithium-containing byproduct generated in the preparation process. When the ultrathin metal lithium foil prepared by the disclosure is used as a metal lithium negative electrode of a lithium battery, the energy density of the battery can be improved, and the battery manufacturing cost is reduced. The ultrathin metal lithium foil can also be used to supplement lithium for other types of electrode materials, thereby a broad application prospect is achieved.

12 Claims, 3 Drawing Sheets

(51) Int. Cl.
  *C01D 15/08* (2006.01)
  *C22B 3/20* (2006.01)
  *C22B 26/12* (2006.01)
  *H01M 4/1395* (2010.01)
  *H01M 4/02* (2006.01)
  *H01M 4/134* (2010.01)

(52) U.S. Cl.
  CPC ........... *C22B 26/12* (2013.01); *H01M 4/1395* (2013.01); *H01M 2004/027* (2013.01); *H01M 4/134* (2013.01)

(56) References Cited

FOREIGN PATENT DOCUMENTS

| CN | 110212152 | 9/2019 |
| CN | 111725496 | 9/2020 |
| CN | 111785933 | 10/2020 |
| JP | 2017173079 | 9/2017 |

OTHER PUBLICATIONS

Mingtao Hu et al., "Facile, Atom-Economic, Chemical Thinning Strategy for Ultrathin Lithium Foils", Nano Letters, Mar. 22, 2022, pp. 3047-3053, vol. 22.
"International Search Report (Form PCT/ISA/210) of PCT/CN2022/137856," mailed on Feb. 28, 2023, with English translation thereof, pp. 1-7.
"Written Opinion of the International Searching Authority (Form PCT/ISA/237) of PCT/CN2022/137856," mailed on Feb. 28, 2023, pp. 1-4.

* cited by examiner

PROCESSING AND RECYCLING METHOD AND PRODUCT OF ULTRATHIN LITHIUM FOIL

CROSS-REFERENCE TO RELATED APPLICATION

This application is a continuation of international application of PCT application serial no. PCT/CN2022/137856, filed on Dec. 9, 2022, which claims the priority benefit of China application no. 202210224380.1, filed on Mar. 7, 2022. The entirety of each of the above-mentioned patent applications is hereby incorporated by reference herein and made a part of this specification.

BACKGROUND

Technical Field

The disclosure belongs to the field of lithium-ion batteries, and more specifically, relates to a method for processing and recycling an ultrathin lithium foil and a product.

Description of Related Art

With the popularization of smart devices and new energy vehicles and the construction of large-scale energy storage facilities, increasing the energy density of lithium-ion batteries and reducing the costs thereof are urgent needs of the market today. Metal lithium is regarded as the most important anode material in the future due to low redox potential (−3.04V versus standard hydrogen electrode) and high theoretical specific capacity (3860 mAh $g^{-1}$, more than ten times of existing graphite anode). However, the existing cathode materials have low specific capacity (<200 mAh $g^{-1}$), and when metal lithium is used as the anode, capacity matching between the cathode and the anode becomes a huge challenge.

At present, the surface capacity of commercial cathode is usually 3 mAh $cm^{-2}$. Once the surface capacity thereof is increased, due to the increase in electrode thickness, the performance of the electrode sheet deteriorates rapidly. Based on the principle of capacity matching, the suitable thickness of the metal lithium anode is approximately 15 μm. However, in reality, the thickness of commercially available lithium foil is usually 50 to 100 μm, and the thinner the thickness, the higher the processing cost, which usually results in a significant excess of lithium as the anode. Excess lithium not only leads to a mismatch in the capacity of the cathode and anode and a significant reduction in the utilization rate of the anode, but also causes an increase in the cost of battery materials and a waste of lithium resources. In addition to being used as the anode, ultrathin lithium can also be applied to prelithiation of electrodes to provide precise lithium compensation capabilities.

Currently, lithium foil is usually produced industrially using roll rolling technology. However, due to high viscosity and poor machinability, it is difficult to perform thinning on lithium. At best, through rolling, a lithium foil with a thickness of 30 μm or more can be produced, and as the thickness of the lithium foil decreases, the rolling processing cost and the precision requirements for the rolling control system increase rapidly. Moreover, during the processing, phenomena such as breakage, sticking to the roll, wrinkling, and damage are prone to happen, and the roll needs to be sprayed before and after production, which is very costly.

In view of the above, it is necessary to develop a simple and scalable process to obtain a new type of lithium thinning technology with a lithium foil thickness of less than 20 μm, which is of great significance for applying to high energy density battery anode materials to meet the needs of industrial production and practical applications.

SUMMARY

In view of the defects of the related, the purpose of the disclosure is to provide a method for processing and recycling an ultrathin lithium foil and a product. A liquid-phase thinning agent in contact reaction with lithium is adopted to react with lithium foil to thin the lithium foil, and an ultrathin lithium foil with a thickness of 20 μm or less is fabricated. The method of the disclosure has high precision and can be randomly regulated, and the obtained ultrathin lithium surface is flat. In addition, the method of the disclosure reduces material waste and improves the economic efficiency of lithium atoms.

To achieve the above purposes, according to an aspect of the disclosure, a method for processing and recycling the ultrathin lithium foil is provided, which includes steps of thinning a thick lithium foil, specifically, a liquid-phase thinning agent is used to perform a contact reaction with a lithium metal, and the lithium foil is further thinned through corrosion of metal lithium by the liquid-phase thinning agent to fabricate ultrathin lithium with a thickness of less than 20 μm. The thick lithium foil refers to a lithium foil with a thickness greater than 20 μm, and in particular, a lithium foil with a thickness greater than 50 μm, or even 100 μm or thicker.

Furthermore, the liquid-phase thinning agent includes a complexing agent and an organic solvent, the complexing agent is dissolved in the organic solvent, and the complexing agent is selected from one or more of naphthalene and derivatives thereof, biphenyl and derivatives thereof, anthracene and derivatives thereof, phenanthrene and derivatives thereof, pyrene and derivatives thereof, and tetracene and derivatives thereof.

Furthermore, the organic solvent is selected from one or more of ethylene glycol dimethyl ether, tetrahydrofuran, diethylene glycol dimethyl ether, and tetraethylene glycol dimethyl ether.

Furthermore, the concentration of the complexing agent in the organic solvent is 0.01 mol/L to 10 mol/L.

Furthermore, the lithium foil includes one or more of a lithium metal foil, a lithium composite foil, and a lithium alloy foil, in which the lithium composite foil includes lithium/metal composite foil and lithium/non-metal composite foil, in which the lithium metal composite foil is a lithium/metal M composite foil, in which the element M includes one or more of Cu, Bi, Ti, V, Cr, Fe, Co, Ni, Cs, Zr, and Ta, and the lithium/non-metal composite foil is a lithium/non-metal X composite foil, in which the element X includes one or more of B, C, and S; the lithium alloy foil is $Li_xN$ alloy foil, in which the element N includes one or more of Zn, In, Al, Mg, B, Pb, Pd, Pd, Sn, Si, Ca, Ag, Au, Ga, and Ge.

Furthermore, according to the thickness requirement of the final ultrathin lithium, the contact reaction time, the contact manner (dynamic or static), or the concentration of the liquid-phase thinning agent may be randomly regulated to achieve random regulation of the thickness of the ultrathin lithium.

Furthermore, the washing liquid obtained after washing can be reused as a thinning agent when the washing liquid is not saturated with lithium, and can be used as a liquid byproduct containing active lithium after saturation. The operation is because the washing liquid also contains complexing agent, when lithium is not saturated, the complexing agent can further react with lithium.

Furthermore, the liquid byproduct containing active lithium can be used as a prelithiation reagent, a surface cleaning agent, or/and a reducing agent.

Furthermore, after the liquid byproduct containing active lithium is used up, waste liquid containing lithium ions is obtained, and a carbonate solution is added to the waste liquid to obtain lithium carbonate precipitation.

According to the second aspect of the disclosure, a product obtained by the method for processing and recycling the ultrathin lithium foil as described above is further provided, and the product includes an ultrathin lithium foil with a thickness of less than 20 μm.

According to the third aspect of the disclosure, a product obtained by the method for processing and recycling the ultrathin lithium foil as described above is further provided, the product includes lithium carbonate, and the lithium carbonate is in powder form.

In general, compared with the related art, the above technical solutions conceived by the disclosure have significantly high engineering application value and specifically have the following beneficial effects:

(1) In the disclosure, liquid phase thinning is used to fabricate ultrathin lithium foil, which avoids the rolling method used in conventional thinning of lithium foil and problems such as easily sticking to the roll, easy breaking, easy wrinkling, and easy damage caused thereby. Through simple liquid phase contact reaction thinning, ultrathin (ultrathin means thickness being 20 μm or less) lithium metal foil, lithium composite foil, and lithium alloy foil can be obtained. The thickness can be randomly regulated and the uniformity is good. The surface oxide layer of the lithium foil is removed, so that the lithium foil is cleaner and flat, and when being used, the surface charge transfer impedance is reduced, and can be used as a high-safety metal lithium negative electrode in lithium batteries to increase the energy density of the battery, reduce the battery manufacturing cost, and improve the utilization rate of lithium. The ultrathin lithium foil of the disclosure can also be used in the lithium supplement process for other types of anode materials, and the lithium supplement capacity is precisely controllable. The produced lithium foil may be thinned once or in multiple times. The method is simple and easy, does not require sophisticated or expensive production equipment, is easy to industrialize, and has no requirements for the purity of lithium in the original lithium foil, thereby a broad application prospect is achieved.

(2) In the disclosure, in the liquid byproduct containing active lithium produced, lithium provides electrons to the complexing agent to form a complex. The delocalized free electrons allow the liquid byproduct containing active lithium to have a strong reducing ability, and can be used as an industrial processing reagent such as prelithiation, reducing agent, surface cleaning agent. After use, the lithium in the liquid byproduct loses electrons and becomes waste liquid containing lithium-ions. The lithium ions contained in the waste liquid can be recovered to obtain a high-value byproduct lithium carbonate finished product, and thus can be recycled. Also, the processing process can be carried out in the air, which reduces the requirements for the environment during storage and transportation and has high safety.

DESCRIPTION OF THE EMBODIMENTS

In order to make the purpose, technical solutions, and advantages of the disclosure more comprehensible, the disclosure is further described in detail below together with the accompanying drawings and embodiments. It should be understood that the specific embodiments described herein are only used to explain the disclosure, and the embodiments are not used to limit the disclosure.

The disclosure provides a method for processing and recycling an ultrathin lithium foil and a product, in which a liquid-phase thinning agent in contact reaction with lithium is adopted to thin the lithium foil, and an ultrathin lithium foil with a thickness of 20 μm or less is fabricated. By adopting the method of the disclosure, the thickness of the lithium foil is highly accurate and can be randomly regulated, and the surface is flat. When the ultrathin lithium foil is used as the anode, the battery energy density can be improved, the utilization rate of lithium can be improved, and the battery cost can be reduced. The flat surface of the ultrathin lithium foil can effectively reduce the surface charge transfer impedance. The ultrathin lithium sheet of the disclosure can also precisely provide lithium supplement capacity when used for prelithiation of electrode sheets of other types of materials. The operation is because when ultrathin lithium is used for prelithiation, the degree and uniformity of lithium supplement reaction can be controlled by adjusting the lithium loading amount, thereby preventing local excessive lithium supplement. In addition, in the disclosure, a method for reusing and recycling the by-product obtained during the operation is provided, thereby reducing the waste of materials and improving the economic efficiency of lithium atoms.

Figure 1:
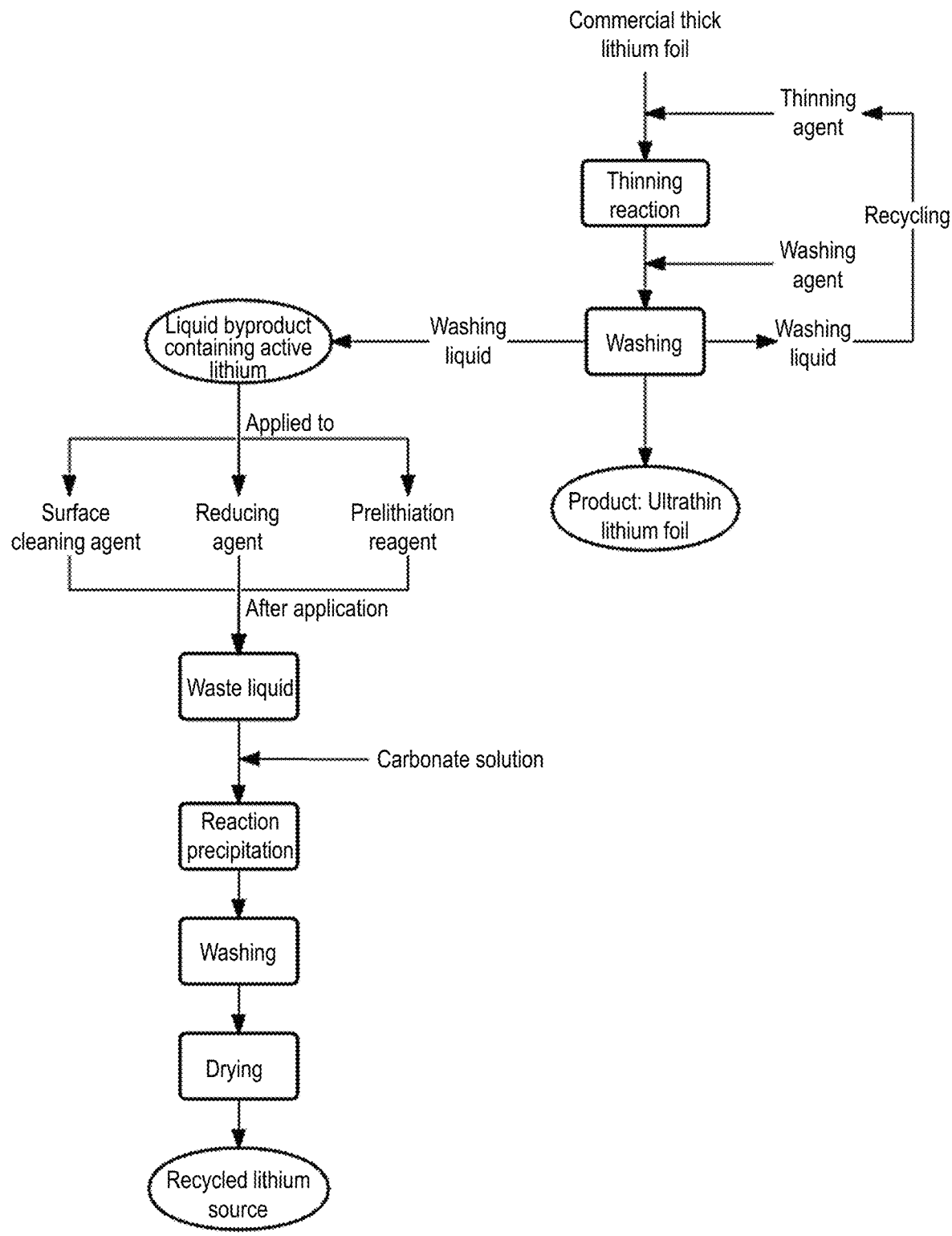
FIG. 1 is a process flow chart of fabricating an ultrathin lithium foil according to an embodiment of the disclosure.
Figure 2:
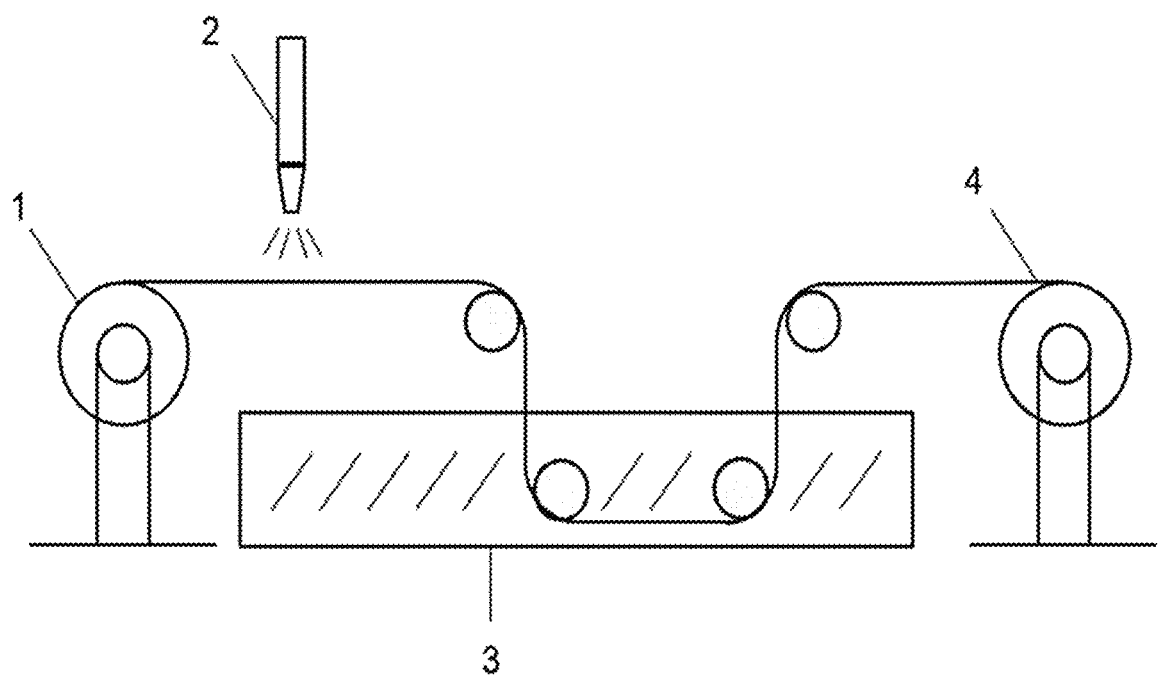
FIG. 2 is a schematic diagram of a device for fabricating the ultrathin lithium foil according to an embodiment of the disclosure.
Figure 3:
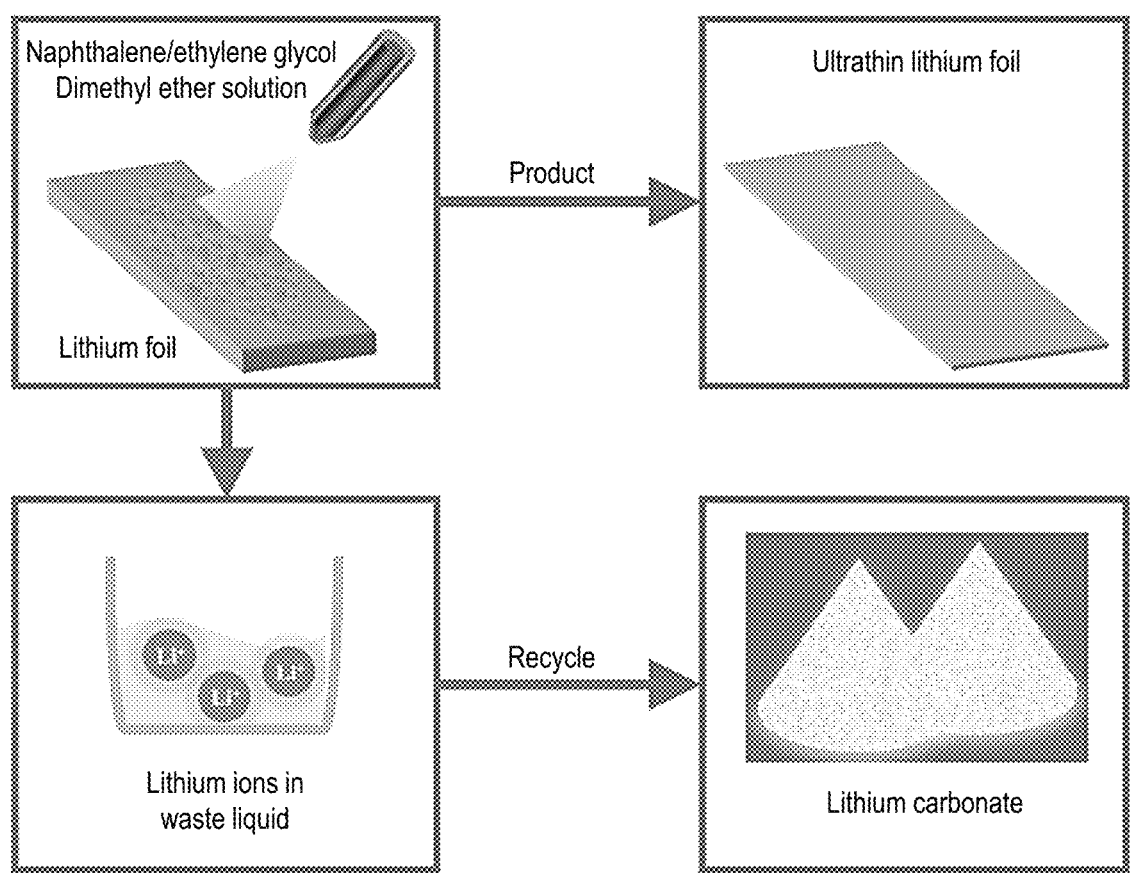
FIG. 3 is a schematic diagram of fabricating the ultrathin lithium foil and recycling waste liquid according to an embodiment of the disclosure.

FIG. 1 is a process flow chart of fabricating an ultrathin lithium foil according to an embodiment of the disclosure, FIG. 2 is a schematic diagram of a device for fabricating the ultrathin lithium foil according to an embodiment of the disclosure, and FIG. 3 is a schematic diagram of fabricating the ultrathin lithium foil and recycling waste liquid according to an embodiment of the disclosure. In the drawings, in FIG. 2, the components indicated by the respective reference numerals are: a thick lithium foil unwinding roller 1, a thinning agent spraying device 2, a cleaning device 3, and an ultrathin lithium foil winding roller 4. The configuration is a set of assembly line devices that may be successfully applied in laboratories or pilot processes. In combination with FIG. 1, FIG. 2, and FIG. 3, it may be seen that the disclosure provides a method for fabricating an ultrathin lithium foil, including the following steps:

(1) A lithium foil is used to perform a contact reaction with a liquid-phase thinning agent;

(2) The reacted lithium foil is washed with a washing agent to obtain an ultrathin lithium foil.

Further in combination with FIG. 1, FIG. 2, and FIG. 3, it may be seen that the disclosure further provides a method for further using a liquid byproduct containing active lithium obtained during the thinning process by the liquid-phase thinning agent as an industrial processing reagent, the liquid byproduct containing active lithium can be used as, but not limited to, a prelithiation reagent, a surface cleaning agent, and a reducing agent. Specifically, the method for recycling and using the waste liquid containing lithium ions obtained after the liquid byproduct containing active lithium is used includes the following steps:

(1) A carbonate solution is added to a waste liquid containing lithium ions obtained after the liquid byproduct containing active lithium is used to obtain lithium carbonate precipitation; in Step (1), the carbonate solution is formed by a solute and a solvent, and the solute is a carbonate having a solubility difference with lithium carbonate in the solvent, including but not limited to sodium carbonate.

(2) The lithium carbonate precipitation obtained in Step (1) is washed and dried to obtain a recovered lithium carbonate product.

In the above method, the lithium foil may be one or more of a lithium metal foil, a lithium composite foil, and a lithium alloy foil, in which the lithium composite foil includes lithium-metal composite foil and lithium-non-metal composite foil, in which in the lithium/metal M composite foil, the element M includes one or more of Cu, Bi, Ti, V, Cr, Fe, Co, Ni, Cs, Zr, and Ta; in the lithium/non-metal X composite foil, the element X includes one or more of B, C, and S; the lithium alloy foil is $Li_xN$ alloy foil, in which element N includes one or more of Zn, In, Al, Mg, B, Pb, Pd, Pd, Sn, Si, Ca, Ag, Au, Ga, and Ge.

In the above method, the liquid-phase thinning agent is prepared by a complexing agent and an organic solvent, and the complexing agent is selected from one or more of naphthalene and derivatives thereof, biphenyl and derivatives thereof, anthracene and derivatives thereof, phenanthrene and derivatives thereof, pyrene and derivatives thereof, and tetracene and derivatives thereof. The organic solvent is selected from organic solvents that can dissolve naphthalene and derivatives thereof, biphenyl and derivatives thereof, anthracene and derivatives thereof, phenanthrene and derivatives thereof, pyrene and derivatives thereof, and tetracene and derivatives thereof, including but not limited to one or more of ethylene glycol dimethyl ether, tetrahydrofuran, diethylene glycol dimethyl ether, and tetraethylene glycol dimethyl ether.

In fact, the complexing agent is not limited to the above types. As long as the following conditions are met, it may be used as the complexing agent: (1) a polycyclic aromatic hydrocarbon; (2) the ability to accept electrons from lithium to form stable free radical anions. The organic solvent is not limited to the above-mentioned types, and as long as the following conditions are met, a substance may be used as the organic solvent: the solvent can dissolve the complexing agent and does not react with lithium.

In order to illustrate the method of the disclosure in more detail, it is further elaborated in combination with specific embodiments below.

Example 1

A certain amount of naphthalene is weighed and uniformly dissolved in a certain amount of ethylene glycol dimethyl ether to prepare a naphthalene/ethylene glycol dimethyl ether organic solution with a concentration of 0.01 mol/L. In a protective atmosphere, a lithium-copper composite tape coil with a lithium foil thickness of 100 μm and a copper foil thickness of 10 μm is unwound and completely spread out in a track, with the lithium foil side facing upward. A nozzle is used to evenly spray 0.01 mol/L naphthalene/ethylene glycol dimethyl ether organic solution onto the lithium foil side of the lithium-copper composite strip so that the lithium foil fully reacts. The lithium-copper composite strip foil is immersed in a pure ethylene glycol dimethyl ether solution and washed to obtain an ultrathin lithium-copper composite strip.

Example 2

A certain amount of naphthalene is weighed and uniformly dissolved in a certain amount of ethylene glycol dimethyl ether to prepare a naphthalene/ethylene glycol dimethyl ether organic solution with a concentration of 0.1 mol/L. In a protective atmosphere, a lithium-copper composite tape coil with a lithium foil thickness of 100 μm and a copper foil thickness of 10 μm is unwound and completely spread out in a track, with the lithium foil side facing upward. A nozzle is used to evenly spray 0.1 mol/L naphthalene/ethylene glycol dimethyl ether organic solution onto the lithium foil side of the lithium-copper composite strip so that the lithium foil fully reacts. The lithium-copper composite strip foil is immersed in a pure ethylene glycol dimethyl ether solution and washed to obtain an ultrathin lithium-copper composite strip.

Example 3

A certain amount of naphthalene is weighed and uniformly dissolved in a certain amount of ethylene glycol dimethyl ether to prepare a naphthalene/ethylene glycol dimethyl ether organic solution with a concentration of 1 mol/L. In a protective atmosphere, a lithium-copper composite tape coil with a lithium foil thickness of 100 μm and a copper foil thickness of 10 μm is unwound and completely spread out in a track, with the lithium foil side facing upward. A nozzle is used to evenly spray 1 mol/L naphthalene/ethylene glycol dimethyl ether organic solution onto the lithium foil side of the lithium-copper composite strip so that the lithium foil fully reacts. The lithium-copper composite strip foil is immersed in a pure ethylene glycol dimethyl ether solution and washed to obtain an ultrathin lithium-copper composite strip.

Example 4

A certain amount of naphthalene is weighed and uniformly dissolved in a certain amount of ethylene glycol dimethyl ether to prepare a naphthalene/ethylene glycol dimethyl ether organic solution with a concentration of 2 mol/L. In a protective atmosphere, a lithium-copper composite tape coil with a lithium foil thickness of 100 μm and a copper foil thickness of 10 μm is unwound and completely spread out in a track, with the lithium foil side facing upward. A nozzle is used to evenly spray 2 mol/L naphthalene/ethylene glycol dimethyl ether organic solution onto the lithium foil side of the lithium-copper composite strip so that the lithium foil fully reacts. The lithium-copper composite strip foil is immersed in a pure ethylene glycol dimethyl ether solution and washed to obtain an ultrathin lithium-copper composite strip.

Example 5

A certain amount of naphthalene is weighed and uniformly dissolved in a certain amount of ethylene glycol dimethyl ether to prepare a naphthalene/ethylene glycol dimethyl ether organic solution with a concentration of 3 mol/L. In a protective atmosphere, a lithium-copper composite tape coil with a lithium foil thickness of 100 μm and a copper foil thickness of 10 μm is unwound and completely spread out in a track, with the lithium foil side facing upward. A nozzle is used to evenly spray 3 mol/L naphthalene/ethylene glycol dimethyl ether organic solution onto the lithium foil side of the lithium-copper composite strip so that the lithium foil fully reacts. The lithium-copper composite strip foil is immersed in a pure ethylene glycol dimethyl ether solution and washed to obtain an ultrathin lithium-copper composite strip.

Example 6

A certain amount of naphthalene is weighed and uniformly dissolved in a certain amount of ethylene glycol dimethyl ether to prepare a naphthalene/ethylene glycol dimethyl ether organic solution with a concentration of 4 mol/L. In a protective atmosphere, a lithium-copper composite tape coil with a lithium foil thickness of 100 μm and a copper foil thickness of 10 μm is unwound and completely spread out in a track, with the lithium foil side facing upward. A nozzle is used to evenly spray 4 mol/L naphthalene/ethylene glycol dimethyl ether organic solution onto the lithium foil side of the lithium-copper composite strip so that the lithium foil fully reacts. The lithium-copper composite strip foil is immersed in a pure ethylene glycol dimethyl ether solution and washed to obtain an ultrathin lithium-copper composite strip.

Example 7

A certain amount of naphthalene is weighed and uniformly dissolved in a certain amount of ethylene glycol dimethyl ether to prepare a naphthalene/ethylene glycol dimethyl ether organic solution with a concentration of 5 mol/L. In a protective atmosphere, a lithium-copper composite tape coil with a lithium foil thickness of 100 μm and a copper foil thickness of 10 μm is unwound and completely spread out in a track, with the lithium foil side facing upward. A nozzle is used to evenly spray 5 mol/L naphthalene/ethylene glycol dimethyl ether organic solution onto the lithium foil side of the lithium-copper composite strip so that the lithium foil fully reacts. The lithium-copper composite strip foil is immersed in a pure ethylene glycol dimethyl ether solution and washed to obtain an ultrathin lithium-copper composite strip.

Example 8

A certain amount of naphthalene is weighed and uniformly dissolved in a certain amount of ethylene glycol dimethyl ether to prepare a naphthalene/ethylene glycol dimethyl ether organic solution with a concentration of 10 mol/L. In a protective atmosphere, a lithium-copper composite tape coil with a lithium foil thickness of 100 μm and a copper foil thickness of 10 μm is unwound and completely spread out in a track, with the lithium foil side facing upward. A nozzle is used to evenly spray 10 mol/L naphthalene/ethylene glycol dimethyl ether organic solution onto the lithium foil side of the lithium-copper composite strip so that the lithium foil fully reacts. The lithium-copper composite strip foil is immersed in a pure ethylene glycol dimethyl ether solution and washed to obtain an ultrathin lithium-copper composite strip.

Example 9

A certain amount of naphthalene is weighed and uniformly dissolved in a certain amount of ethylene glycol dimethyl ether to prepare a naphthalene/ethylene glycol dimethyl ether organic solution with a concentration of 10 mol/L. In a dry atmosphere, a lithium-copper composite tape coil with a lithium foil thickness of 100 μm and a copper foil thickness of 10 μm is unwound and completely spread out in a track, with the lithium foil side facing upward. The lithium copper composite strip is soaked in a 10 mol/L naphthalene/ethylene glycol dimethyl ether organic solution so that the lithium foil fully reacts. The lithium-copper composite strip foil is immersed in a pure ethylene glycol dimethyl ether solution and washed to obtain an ultrathin lithium-copper composite strip.

TABLE 1

Detailed data of lithium foil obtained from thinning by organic solutions of different concentrations in the embodiments

| Example | Original lithium thickness (micrometers) | Organic solvent concentration (mol/L) | Manner of contact reaction | Reaction time (minutes) | Lithium thickness after thinning (micrometers) |
|---|---|---|---|---|---|
| 1 | 100 | 0.01 | dynamic | 360 | 18 |
| 2 | 100 | 0.1 | dynamic | 180 | 18 |
| 3 | 100 | 1 | dynamic | 60 | 16 |
| 4 | 100 | 2 | dynamic | 50 | 14 |
| 5 | 100 | 3 | dynamic | 40 | 12 |
| 6 | 100 | 4 | dynamic | 30 | 10 |
| 7 | 100 | 5 | dynamic | 20 | 10 |
| 8 | 100 | 10 | dynamic | 10 | 10 |
| 9 | 100 | 10 | static | 30 | 10 |

In the embodiments, the manner of contact reaction of the liquid-phase thinning agent with the thick lithium foil in Table 1 being dynamic or static means that whether the liquid-phase thinning agent is flowing or static when being in contact reaction with lithium. For example, spraying is a manner of dynamic reaction, and soaking is a manner of static reaction.

The above embodiments may be carried out under a protective atmosphere or in a dry environment, and are not limited to the protective atmosphere. In fact, the operation environment of metal lithium only needs to reduce the water content, and the operation may be safely performed in a dry room. Pure oxygen and oxygen under dry conditions are not easy to react with metal lithium.

Example 10

A certain amount of sodium carbonate is weighed and uniformly dissolved in a certain amount of water to prepare a saturated sodium carbonate solution with a concentration of 300 g/L at room temperature. For the waste liquid containing lithium ions obtained after the byproduct containing active lithium is used, that is, the lithium naphthalene/ethylene glycol dimethyl ether solution containing lithium ions, a saturated sodium carbonate solution is added to the lithium naphthalene/ethylene glycol dimethyl ether waste liquid. After full reaction for 10 minutes, lithium carbonate precipitation is obtained. The lithium carbonate precipitation is washed with hot water at 40° C. and dried in a drying oven at 300° C. to obtain a recycled lithium carbonate product.

The disclosure uses a liquid-phase thinning agent to fabricate ultrathin lithium, and obtains a lithium foil with a thickness of 20 μm or less. The thickness can be randomly regulated, and the surface is clean and flat, which meets the use requirements of the metal lithium negative electrode in the lithium battery and other types of negative electrode material lithium supplement processes. Also, the lithium-containing byproduct produced during the thinning process can be reused and recycled, which is green and environmentally friendly. The method is simple and easy, does not require sophisticated or expensive production equipment, thereby a broad application prospect is achieved.

Example 11

A certain amount of biphenyl is weighed and uniformly dissolved in a certain amount of tetrahydrofuran to prepare a biphenyl/tetrahydrofuran organic solution with a concentration of 2.8 mol/L. In a protective atmosphere, a lithium foil of Li/Zn alloy with a thickness of 80 μm is unwound and completely spread out in a track, with one side facing upward. A nozzle is used to evenly spray 2.8 mol/L naphthalene/ethylene glycol dimethyl ether organic solution onto the lithium foil side so that the lithium foil fully reacts. The Li/Zn alloy lithium foil is immersed in a pure ethylene glycol dimethyl ether solution and washed to obtain an ultrathin Li/Zn alloy lithium foil strip with a thickness of 14 μm.

Example 12

A certain amount of anthracene is weighed and uniformly dissolved in a certain amount of diethylene glycol dimethyl ether to prepare an anthracene/diethylene glycol dimethyl ether organic solution with a concentration of 3.8 mol/L. In a protective atmosphere, Li/C composite lithium foil with a thickness of 90 μm is unwound and spread in a track until completely spread out, with the Li side facing upward. A nozzle is used to evenly spray 3.8 mol/L anthracene/diethylene glycol dimethyl ether organic solution onto the lithium foil side of the Li/C composite lithium foil composite strip so that the lithium foil fully reacts. The Li/C composite lithium foil is immersed in a pure ethylene glycol dimethyl ether solution and washed to obtain an ultrathin lithium foil strip with a thickness of 10 μm.

Example 13

A certain amount of phenanthrene is weighed and uniformly dissolved in a certain amount of tetraethylene glycol dimethyl ether to prepare a phenanthrene/tetraethylene glycol dimethyl ether organic solution with a concentration of 1.8 mol/L. In a protective atmosphere, a Li/Al alloy lithium foil with a thickness of 100 μm is unwound and spread in a track until completely spread out. A nozzle is used to evenly spray 1.8 mol/L of phenanthrene/tetraethylene glycol dimethyl ether organic solution on one side of the Li/Al alloy lithium foil strip so that the lithium foil fully reacts. The Li/Al alloy lithium foil strip is immersed in a pure ethylene glycol dimethyl ether solution and washed to obtain an ultrathin lithium foil strip with a thickness of 13 μm.

Example 14

A certain amount of pyrene is weighed and uniformly dissolved in a certain amount of tetraethylene glycol dimethyl ether to prepare a pyrene/tetraethylene glycol dimethyl ether organic solution with a concentration of 0.9 mol/L. In a protective atmosphere, Li/Mg alloy lithium foil with a thickness of 100 μm is unwound and spread in a track until completely spread out. A nozzle is used to evenly spray 0.9 mol/L pyrene/tetraethylene glycol dimethyl ether organic solution onto one side of the Li/Mg alloy lithium foil strip so that the Li/Mg alloy lithium foil fully reacts. The Li/Mg alloy lithium foil strip is immersed in a pure ethylene glycol dimethyl ether solution and washed to obtain an ultrathin lithium foil strip with a thickness of 13 μm.

Example 15

A certain amount of tetracene is weighed and uniformly dissolved in a certain amount of tetraethylene glycol dimethyl ether to prepare a tetracene/tetraethylene glycol dimethyl ether organic solution with a concentration of 0.5 mol/L. In a protective atmosphere, Li/Ge alloy lithium foil with a thickness of 100 μm is unwound and spread in the track until completely spread out. A nozzle is used to evenly spray 0.9 mol/L of tetracene/tetraethylene glycol dimethyl ether organic solution onto one side of the Li/Ge alloy lithium foil strip so that the Li/Ge alloy lithium foil fully reacts. The Li/Ge alloy lithium foil strip is immersed in a pure ethylene glycol dimethyl ether solution and washed to obtain an ultrathin lithium foil strip with a thickness of 18 μm.

Figure 4:
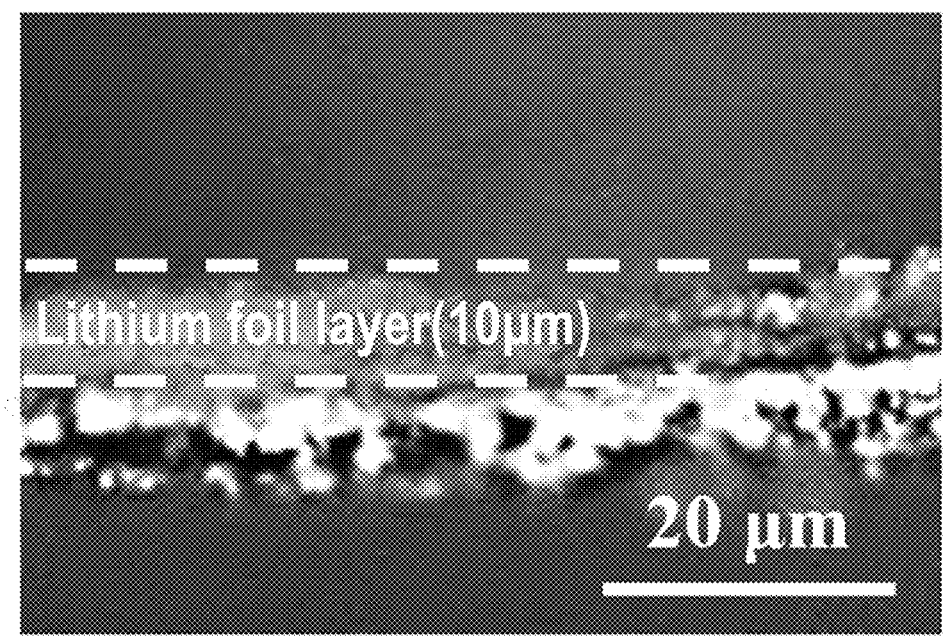
FIG. 4 is an electron microscope photograph of a cross section of the ultrathin metal lithium foil according to an embodiment of the disclosure.

FIG. 4 is an electron microscope photograph of a cross section of the ultrathin metal lithium foil according to an embodiment of the disclosure. It may be seen from the figure that the thickness of the obtained ultrathin lithium foil is 10 micrometers.

It will be easily understood by persons skilled in the art that the above description is only preferred embodiments of the disclosure and the embodiments are not intended to limit the disclosure. Any modifications, equivalent substitutions, and improvements made within the spirit and principles of the disclosure should be included in the protection scope of the disclosure.

What is claimed is:

1. A method for processing and recycling an ultrathin lithium foil, comprising thinning a thick lithium foil, specifically, using a liquid-phase thinning agent to perform a contact reaction with a lithium metal, and further thinning the lithium foil through corrosion of metal lithium by the liquid-phase thinning agent to fabricate ultrathin lithium with a thickness of less than 20 μm, wherein
the liquid-phase thinning agent comprises a complexing agent and an organic solvent, the complexing agent is dissolved in the organic solvent, and the complexing agent is selected from one or more of naphthalene and derivatives thereof, biphenyl and derivatives thereof, anthracene and derivatives thereof, phenanthrene and derivatives thereof, pyrene and derivatives thereof, and tetracene and derivatives thereof.

2. The method for processing and recycling the ultrathin lithium foil of claim 1, wherein the organic solvent is selected from one or more of ethylene glycol dimethyl ether, tetrahydrofuran, diethylene glycol dimethyl ether, and tetraethylene glycol dimethyl ether.

3. The method for processing and recycling the ultrathin lithium foil of claim 2, wherein a concentration of the complexing agent in the organic solvent is 0.01 mol/L to 10 mol/L.

4. The method for processing and recycling the ultrathin lithium foil of claim 2, wherein the lithium foil after the contact reaction with the thinning agent is washed with a washing agent to remove the thinning agent remaining on a surface to obtain the ultrathin lithium foil, and the washing agent is selected from one or more of ethylene glycol dimethyl ether, tetrahydrofuran, diethylene glycol dimethyl ether, and tetraethylene glycol dimethyl ether.

5. The method for processing and recycling the ultrathin lithium foil of claim 1, wherein the thick lithium foil comprises one or more of a lithium metal foil, a lithium composite foil, and a lithium alloy foil, wherein the lithium composite foil comprises a lithium/metal M composite foil and a lithium/non-metal X composite foil, wherein the element M comprises one or more of Cu, Bi, Ti, V, Cr, Fe, Co, Ni, Cs, Zr, and Ta, and the element X comprises one or more of B, C, and S; the lithium alloy foil is $Li_xN$ alloy foil, wherein the element N comprises one or more of Zn, In, Al, Mg, B, Pb, Pd, Pd, Sn, Si, Ca, Ag, Au, Ga, and Ge.

6. The method for processing and recycling the ultrathin lithium foil of claim 1, wherein according to a thickness requirement of a final ultrathin lithium, a contact reaction time, a contact manner, or a concentration of the liquid-phase thinning agent is randomly regulated to achieve random regulation of the thickness of the ultrathin lithium.

7. The method for processing and recycling the ultrathin lithium foil of claim 2, wherein according to a thickness requirement of a final ultrathin lithium, a contact reaction time, a contact manner, or a concentration of the liquid-phase thinning agent is randomly regulated to achieve random regulation of the thickness of the ultrathin lithium.

8. The method for processing and recycling the ultrathin lithium foil of claim 3, wherein according to a thickness requirement of a final ultrathin lithium, a contact reaction time, a contact manner, or a concentration of the liquid-phase thinning agent is randomly regulated to achieve random regulation of the thickness of the ultrathin lithium.

9. The method for processing and recycling the ultrathin lithium foil of claim 4, wherein according to a thickness requirement of a final ultrathin lithium, a contact reaction time, a contact manner, or a concentration of the liquid-phase thinning agent is randomly regulated to achieve random regulation of the thickness of the ultrathin lithium.

10. The method for processing and recycling the ultrathin lithium foil of claim 5, wherein according to a thickness requirement of a final ultrathin lithium, a contact reaction time, a contact manner, or a concentration of the liquid-phase thinning agent is randomly regulated to achieve random regulation of the thickness of the ultrathin lithium.

11. The method for processing and recycling the ultrathin lithium foil of claim 6, wherein the metal lithium is corroded by the liquid-phase thinning agent, and washing liquid containing active lithium is obtained after washing, the washing liquid is used as a liquid byproduct containing active lithium used as a prelithiation reagent, a surface cleaning agent, or/and a reducing agent.

12. The method for processing and recycling the ultrathin lithium foil of claim 11, wherein after the liquid byproduct containing active lithium is used up, a waste liquid containing lithium ions is obtained, a carbonate solution is added to the waste liquid to obtain lithium carbonate precipitation, and a lithium source dissolved in the liquid phase is recovered.

* * * * *